United States Patent
Yao et al.

(10) Patent No.: US 12,475,289 B2
(45) Date of Patent: Nov. 18, 2025

(54) GENERAL DECOUPLING METHOD AND SYSTEM FOR ELECTROMAGNETIC TRANSIENT SIMULATION OF VOLTAGE SOURCE CONVERTER

(71) Applicant: NORTH CHINA ELECTRIC POWER UNIVERSITY, Beijing (CN)

(72) Inventors: Shujun Yao, Beijing (CN); Bohan Pang, Beijing (CN); Mingwang Xu, Beijing (CN); Ziwen Zeng, Beijing (CN); Zijian Qiu, Beijing (CN); Gang Liu, Beijing (CN); Chunqiang Zhang, Beijing (CN); Jiahao Ma, Beijing (CN); Yan Wang, Beijing (CN); Jin Liu, Beijing (CN); Yifan Yao, Beijing (CN); Mengtong Wu, Beijing (CN)

(73) Assignee: NORTH CHINA ELECTRIC POWER UNIVERSITY, Beijing (CN)

( * ) Notice: Subject to any disclaimer, the term of this patent is extended or adjusted under 35 U.S.C. 154(b) by 1024 days.

(21) Appl. No.: 17/539,003

(22) Filed: Nov. 30, 2021

(65) Prior Publication Data
US 2022/0366115 A1    Nov. 17, 2022

(30) Foreign Application Priority Data
May 17, 2021   (CN) .......................... 202110532372.9

(51) Int. Cl.
*G06F 30/367*    (2020.01)
*G06F 111/10*    (2020.01)

(52) U.S. Cl.
CPC ........ *G06F 30/367* (2020.01); *G06F 2111/10* (2020.01)

(58) Field of Classification Search
None
See application file for complete search history.

(56) References Cited

U.S. PATENT DOCUMENTS

2017/0132337 A1 * 5/2017 Li ..................... G06F 30/367
2020/0201953 A1 * 6/2020 Shi .................... G06F 30/367

FOREIGN PATENT DOCUMENTS

CN          108959671 B  * 10/2021 ........... G06F 30/367
WO   WO-2018058869 A1 *  4/2018 ............. G06F 30/20

OTHER PUBLICATIONS

Switching Transient Simulation and System Efficiency Evaluation of Megawatt Power Electronics Converter with Discrete State Event-Driven Approach. IEEE Transactions on Industrial Electronics: A Publication of the IEEE Industrial Electronics Society., vol. 69, No. 3, 2021 (Year: 2021).*

* cited by examiner

*Primary Examiner* — Rehana Perveen
*Assistant Examiner* — Eric A Post
(74) *Attorney, Agent, or Firm* — Notaro, Michalos & Zaccaria P.C.

(57) ABSTRACT

A general decoupling method and system for electromagnetic transient simulation of a VSC are provided. The method includes: determining state equations of equivalent circuits and switch state tables of different VSCs; splitting the state equations, and decoupling and delaying capacitor elements and inductor elements to determine split equations; determining a recurrence relation of a state variable group with respect to a time sequence based on each split equation; obtaining a topological structure of a to-be-simulated VSC, and determining a decoupling model circuit; determining a switch state of the to-be-simulated VSC at a current simulation moment, and constructing a final decoupling model circuit; determining an external port voltage based on the final decoupling model circuit; and updating the state variable group at the current simulation moment based on the external port voltage and the parameters of the decoupling model circuit corresponding to the switch state.

6 Claims, 12 Drawing Sheets

GENERAL DECOUPLING METHOD AND SYSTEM FOR ELECTROMAGNETIC TRANSIENT SIMULATION OF VOLTAGE SOURCE CONVERTER

CROSS REFERENCE TO RELATED APPLICATION

This patent application claims the benefit and priority of Chinese Patent Application No. 202110532372.9, filed on May 17, 2021, the disclosure of which is incorporated by reference herein in its entirety as part of the present application.

TECHNICAL FIELD

The present disclosure relates to a field of electromagnetic transient simulation, and in particular to a general decoupling method and system for electromagnetic transient simulation of a voltage source converter (VSC).

BACKGROUND ART

Electromagnetic transient simulation, usually including real-time simulation and offline simulation, is an important tool for safety and stability analysis of the power system. The offline simulation is mainly used for a research of large-scale alternating current/direct current grids, while the real-time simulation, due to its high price, is mainly used for the research of characteristics and control strategies of power electronic equipment.

The proposal of the "double high" (high penetrations of renewable energy and high penetrations of power electronic equipment) power system has brought about new changes in the characteristics of power electronic equipment connected to the power system:

(1) More complex characteristics. In addition to the traditional two-level voltage source converter (VSC), line commutated converter (LCC), and modular multilevel converter (MMC), power electronic equipment with more complex characteristics, such as a high-frequency link power electronic transformer and a multi-port energy router, emerges along with requirements and in-depth research on the remote offshore DC wind farm, the DC distribution grid, and the flexible substation. Time-varying and nonlinear characteristics of these equipment are more prominent.

(2) More diverse topologies. With the requirements for multi-directional energy flow, the power electronic equipment often needs a multi-stage and/or multi-port structure. Different ports and different conversion stages are linked in series and parallel. The electric and magnetic coupling between the ports and the conversion stages is tight, and the equipment topologies are more complex and diverse.

(3) Larger number of switch devices. For example, as the Modular Multilevel Converter based High Voltage Direct Current (MMC-HVDC) project continues to develop towards higher DC voltage and transmission power levels, the number of sub-modules required by MMC is also rapidly increasing. For example, in the Zhangbei flexible DC power grid project that has been put into operation, a single MMC bridge arm contains 264 sub-modules (taking into account the redundancy), a double-ended system includes a total of 3168 sub-modules, and the admittance matrix of the system will become an ultra-high-ordered time-varying linear algebraic equation set.

Electromagnetic transient simulation needs to be accurate and fast. However, above three changes have made the contradiction between the accuracy and rapidity of simulation of the VSC more prominent. The existing methods are not applicable anymore and urgently need to be improved, or a new method needs to be proposed.

According to different actual needs, there are different electromagnetic transient simulation models of the VSC, including the detailed device-level model, the general controlled-source electromagnetic transient model, the average-value model, and the high-efficient Thevenin equivalent model. Different models have different accuracy, calculation speed and application scenarios.

Detailed model and controlled-source model: Due to transient behavior of the semiconductor switch, the detailed model needs to solve a large number of electrical nodes, also needs an algorithm for quickly solving nonlinear switch events, and requires the calculation method to have capability of solving the "stiff" differential equation. The detailed model takes long time for the overall calculation, is mainly used to verify other simplified equivalent models, and is not suitable for simulation modeling of a large-scale power system. The controlled-source model, essentially as an improved detailed model, has versatility and is easy to implement. However, the controlled-source model uses too many detailed devices, has low efficiency during simulation of a large-scale DC grid, and has poor expansion flexibility, so that it cannot be used for real-time simulation.

Average-value model and arm equivalent model: The average-value model has fast calculation speed, a high degree of simplification and low accuracy, and cannot simulate charging and discharging characteristics of the converter. Since the accuracy of the external characteristic analysis is also closely related to the capacitance value of the converter, the application scope of the average-value model is also limited.

Thevenin equivalent model: The Thevenin equivalent model reduces the number of electrical nodes, such that the dimension of the matrix for solving the equation of the main system is greatly reduced, which can reduce the amount of calculation and improve the calculation speed. In addition, the method has to use the implicit backward Euler method to avoid numerical oscillations caused by sudden changes of non-state variables (the inductor voltage or the capacitor current) during switch operations, thereby losing the parallel characteristics. Furthermore, if the converter topology becomes complex and the number of levels increases, the control strategies will become complex and diverse, which will eventually lead to an insignificant increase in the calculation speed of the solution.

The common problem of the above models is that there is coupling between the AC and DC sides during a simulation process, and the admittance matrix of the system changes frequently with the switch actions of the converter, which leads to low simulation efficiency.

In conclusion, the existing technologies have the following disadvantages:

There is a contradiction between accuracy and calculation efficiency in the electromagnetic transient simulation model of the VSC. A highly-complex model of the VSC has high calculation accuracy, but inevitably consumes a lot of modeling time and calculation amount; while a low-complex model of the VSC can improve efficiency, but may lose the electromagnetic transient phenomenon to be studied.

SUMMARY

The object of the present disclosure is to provide a general decoupling method and system for electromagnetic transient simulation of a voltage source converter (VSC), to solve the problem of low simulation efficiency caused by the difficulty in balancing the accuracy and efficiency of the electromagnetic transient simulation of the VSC.

In order to achieve the foregoing object, the present disclosure provides the following solution:

A general decoupling method for electromagnetic transient simulation of a VSC includes:

obtaining topological structures of different VSCs, and equivalently generating equivalent circuits of the VSCs for the topological structures;

determining state equations of the equivalent circuits and switch state tables of the VSCs, where the switch state tables include switch states of the different VSCs and parameters of decoupling model circuits corresponding to the switch states, and the parameters of the decoupling model circuits include a variable resistor, a controlled voltage source, and a controlled current source;

splitting the state equations, and decoupling and delaying capacitor elements and inductor elements in the VSCs to determine split equations;

determining, based on each split equation, a recurrence relation of a state variable group with respect to a time sequence, where the state variable group includes a port current and a voltage of each of the capacitor elements;

obtaining a topological structure of a to-be-simulated VSC, and determining a decoupling model circuit based on the recurrence relation of the state variable group with respect to the time sequence;

obtaining a current simulation moment, determining a switch state of the to-be-simulated VSC at the current simulation moment, and transferring, to the decoupling model circuit, parameters of the decoupling model circuit corresponding to the switch state of the to-be-simulated VSC based on the switch state table, to construct a final decoupling model circuit;

determining an external port voltage of the to-be-simulated VSC at the current simulation moment based on the final decoupling model circuit; and updating the state variable group at the current simulation moment based on the recurrence relation of the state variable group with respect to the time sequence, the external port voltage and the parameters of the decoupling model circuit corresponding to the switch state of the to-be-simulated VSC.

In an embodiment, the state equation of the equivalent circuit is:

$$\begin{bmatrix} C & \\ & L \end{bmatrix}\begin{bmatrix} \frac{du_C}{dt} \\ \frac{di_{arm}}{dt} \end{bmatrix} = \begin{bmatrix} -G_{eq} & K_i \\ -K_u & -R_{eq} \end{bmatrix}\begin{bmatrix} u_C \\ i_{arm} \end{bmatrix} + \begin{bmatrix} i_d \\ u_{sm} \end{bmatrix},$$

where $C=\mathrm{diag}[C_1, C_2, \ldots, C_{m1}]$ is an m1×m1 diagonal matrix, and $C_1, C_2, \ldots, C_{m1}$ represent m1 capacitors in the converter; $L=\mathrm{diag}[L_1, L_2, \ldots, L_{m2}]$ is an m2×m2 diagonal matrix, and $L_1, L_2, \ldots L_{m2}$ represent m2 inductors in the converter; $u_C=[u_{C1}, u_{C2}, \ldots, u_{Cm1}]^T$ is an m×1 column vector, and $u_{C1}, u_{C2}, \ldots, u_{Cm1}$ are capacitor voltages of m1 capacitor elements; $i_{arm}$ is a port current of the VSC; $G_{eq}$ is an admittance in parallel with the capacitor; $R_{eq}$ is a variable resistor in series with the inductor; $K_u$ is a coefficient matrix related to the capacitor voltage; $K_i$ is a coefficient matrix related to the inductor current; $i_d$ is an injection current of the capacitor element inside the VSC; and $u_{sm}$ is a port voltage of the VSC.

In an embodiment, the split equation is:

$$\begin{bmatrix} C & \\ & L \end{bmatrix}\begin{bmatrix} \frac{du_C}{dt} \\ \frac{di_{arm}}{dt} \end{bmatrix} = \begin{bmatrix} 0 & \\ & -R_{eq} \end{bmatrix}\begin{bmatrix} u_C \\ i_{arm} \end{bmatrix} + \begin{bmatrix} & K_i \\ -K_u & \end{bmatrix}\begin{bmatrix} u_C \\ i_{arm} \end{bmatrix} + \begin{bmatrix} i_d \\ u_{sm} \end{bmatrix}.$$

In an embodiment, determining, based on each split equation, the recurrence relation of the state variable group with respect to the time sequence may include:

differentiating the split equation by an implicit trapezoidal method, and replacing a trapezoidal integral form in a specified area with a central integral form, to determine the recurrence relation of the state variable group with respect to the time sequence.

In an embodiment, after updating the state variable group at the current simulation moment based on the recurrence relation of the state variable group with respect to the time sequence, the external port voltage and the parameters of the decoupling model circuit corresponding to the switch state of the to-be-simulated VSC, the method may further include:

determining whether current simulation duration is less than total simulation duration, and obtaining a first determining result;

when the first determining result indicates that the current simulation duration is less than the total simulation duration, using a next simulation moment as the current simulation moment, and returning to the step of "determining the switch state of the to-be-simulated VSC at the current simulation moment, and transferring, to the decoupling model circuit, the parameters of the decoupling model circuit corresponding to the switch state of the to-be-simulated VSC based on the switch state table, to construct a final decoupling model circuit"; and terminating a simulation process when the first determining result indicates that the current simulation duration is not less than the total simulation duration.

A general decoupling system for electromagnetic transient simulation of a VSC includes:

an equivalent circuit generation module, configured to obtain topological structures of different VSCs, and equivalently generate equivalent circuits of the VSCs for the topological structures;

a state equation and switch state table determining module, configured to determine state equations of the equivalent circuits and switch state tables of the VSCs, where the switch state tables include switch states of the different VSCs and parameters of decoupling model circuits corresponding to the switch states, and the parameters of the decoupling model circuits include a variable resistor, a controlled voltage source, and a controlled current source;

a split equation determining module, configured to split the state equations, and decouple and delay capacitor elements and inductor elements in the VSCs to determine split equations;

a module for determining a recurrence relation of a state variable group with respect to a time sequence, configured to determine, based on each split equation, the recurrence relation of the state variable group with respect to the time sequence, where the state variable group includes a port current and a voltage of each of the capacitor elements;

a decoupling model circuit determining module, configured to obtain a topological structure of a to-be-simulated VSC, and determine a decoupling model circuit based on the recurrence relation of the state variable group with respect to the time sequence;

a final decoupling model circuit construction module, configured to: obtain a current simulation moment, determine a switch state of the to-be-simulated VSC at the current simulation moment, and transfer, to the decoupling model circuit, parameters of the decoupling model circuit corresponding to the switch state of the to-be-simulated VSC based on the switch state table, to construct a final decoupling model circuit;

an external port voltage determining module, configured to determine an external port voltage of the to-be-simulated VSC at the current simulation moment based on the final decoupling model circuit; and a state variable group update module, configured to update the state variable group at the current simulation moment based on the recurrence relation of the state variable group with respect to the time sequence, the external port voltage and the parameters of the decoupling model circuit corresponding to the switch state of the to-be-simulated VSC.

In an embodiment, the state equation of the equivalent circuit is:

$$\begin{bmatrix} C & \\ & L \end{bmatrix} \begin{bmatrix} \frac{du_C}{dt} \\ \frac{di_{arm}}{dt} \end{bmatrix} = \begin{bmatrix} -G_{eq} & K_i \\ -K_u & -R_{eq} \end{bmatrix} \begin{bmatrix} u_C \\ i_{arm} \end{bmatrix} + \begin{bmatrix} i_d \\ u_{sm} \end{bmatrix},$$

where $C=\text{diag }[C_1, C_2, \ldots, C_{m1}]$ is an m1×m1 diagonal matrix, and $C_1, C_2, \ldots, C_{m1}$ represent m1 capacitors in the converter; $L=\text{diag}[L_1, L_2, \ldots, L_{m2}]$ is an m2×m2 diagonal matrix, and $L_1, L_2, \ldots L_{m2}$ represent m2 inductors in the converter; $u_C=[u_{C1}, u_{C2}, \ldots, u_{Cm1}]^T$ is an m×1 column vector, and $u_{C1}, u_{C2}, \ldots, u_{Cm1}$ are capacitor voltages of m1 capacitor elements; $i_{arm}$ is a port current of the VSC; $G_{eq}$ is an admittance in parallel with the capacitor; $R_{eq}$ is a variable resistor in series with the inductor; $K_u$ is a coefficient matrix related to the capacitor voltage; $K_i$ is a coefficient matrix related to the inductor current; $i_d$ is an injection current of the capacitor element inside the VSC; and $u_{sm}$ is a port voltage of the VSC.

In an embodiment, the split equation is:

$$\begin{bmatrix} C & \\ & L \end{bmatrix} \begin{bmatrix} \frac{du_C}{dt} \\ \frac{di_{arm}}{dt} \end{bmatrix} = \begin{bmatrix} 0 & \\ & -R_{eq} \end{bmatrix} \begin{bmatrix} u_C \\ i_{arm} \end{bmatrix} + \begin{bmatrix} & K_i \\ -K_u & \end{bmatrix} \begin{bmatrix} u_C \\ i_{arm} \end{bmatrix} + \begin{bmatrix} i_d \\ u_{sm} \end{bmatrix}.$$

In an embodiment, the module for determining the recurrence relation of the state variable group with respect to the time sequence may include:

a unit for determining the recurrence relation of the state variable group with respect to the time sequence, configured to differentiate the split equation by an implicit trapezoidal method, and replace a trapezoidal integral form in a specified area with a central integral form, to determine the recurrence relation of the state variable group with respect to the time sequence.

In an embodiment, the system may further include:

a first determining module, configured to determine whether current simulation duration is less than total simulation duration, and obtain a first determining result;

a step return module, configured to: when the first determining result indicates that the current simulation duration is less than the total simulation duration, use a next simulation moment as the current simulation moment, and return to the step of "determining the switch state of the to-be-simulated VSC at the current simulation moment, and transfer, to the decoupling model circuit, the parameters of the decoupling model circuit corresponding to the switch state of the to-be-simulated VSC based on the switch state table, to construct a final decoupling model circuit"; and a simulation termination module, configured to terminate a simulation process when the first determining result indicates that the current simulation duration is not less than the total simulation duration.

According to specific embodiments provided in the present disclosure, the present disclosure discloses following technical effects: the present disclosure provides a general decoupling method and system for electromagnetic transient simulation of the VSC, in which the state equation is split, and the capacitor elements and the inductor elements in the VSC are decoupled and delayed, to realize delay and decoupling of the state variable group and construct a fast decoupling model circuit of the VSC, which improves the simulation efficiency of the converter and realizes decoupling of AC and DC sides. The state variable group is electrical quantity (the port current $i_{arm}$ and the capacitor voltage $u_C$) in the VSC.

When the capacitor elements and inductor elements in the VSC are decoupled and delayed, decoupled variables do not change suddenly due to switch actions, so there is no need to switch the integral form (for example, switching from the central integral to backward Euler) during the switch actions. In this way, the consistency of the decoupling forms may be maintained without losing its parallel characteristics, thereby improving the simulation accuracy.

BRIEF DESCRIPTION OF THE DRAWINGS

In order to explain the embodiments of the present disclosure or the technical solutions in the conventional art more clearly, the accompanying drawings used in the embodiments will be briefly described below. Apparently, the accompanying drawings described below show merely some embodiments of the present disclosure. For those of ordinary skill in the art, other drawings can be obtained according to the accompanying drawings without creative efforts.

DETAILED DESCRIPTION OF THE EMBODIMENTS

The technical solutions in the embodiments of the present disclosure will be clearly and completely described below in conjunction with the accompanying drawings in the embodiment of the present disclosure. Apparently, the described embodiments are merely a part of the embodiments of the present disclosure, rather than all of the embodiments. All other embodiments obtained by the ordinary skilled in the art based on the embodiments of the present disclosure without creative efforts fall within the scope of protection of the present disclosure.

To make the above object, features and advantages of the present disclosure clearer and more comprehensible, the present disclosure is described in further detail below in conjunction with the accompanying drawings and specific implementations.

Figure 1:
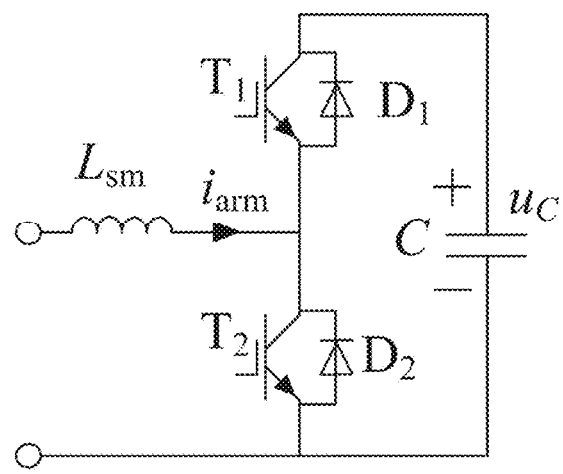
FIG. 1 is a topology diagram of a half-bridge sub-module.
Figure 2:
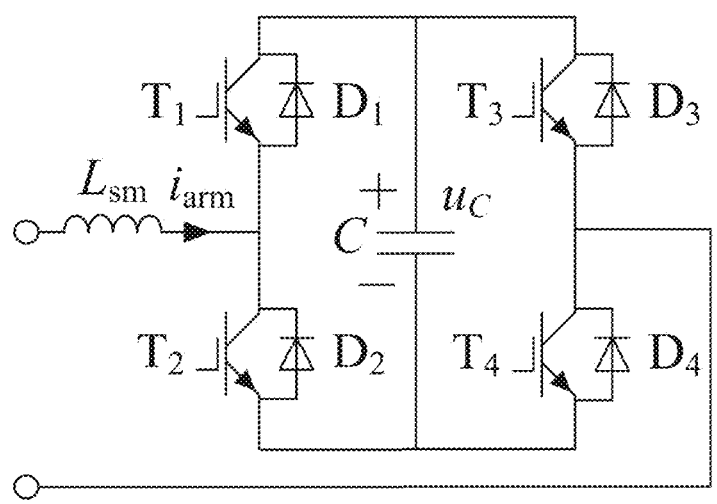
FIG. 2 is a topology diagram of a full-bridge sub-module.
Figure 3:
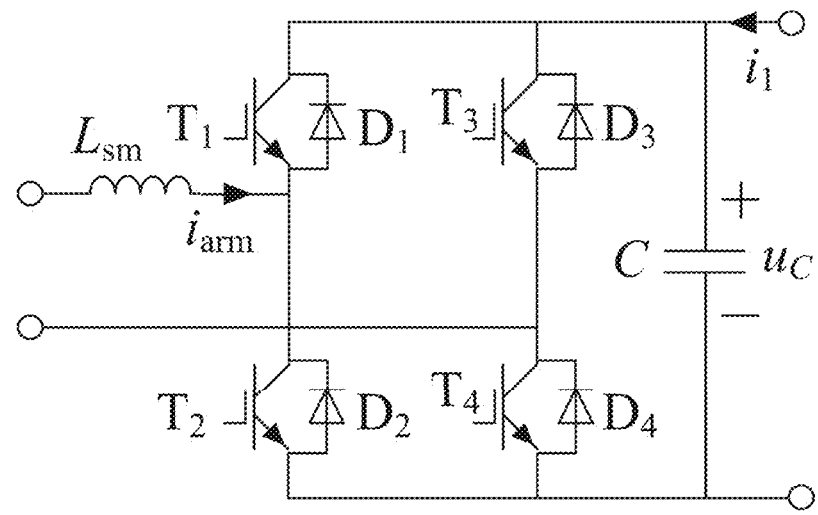
FIG. 3 is a topology diagram of an H-bridge module.

Topology diagrams of modules in common VSCs are as shown in FIG. 1 to FIG. 3. A complex VSC may include a combination of a half-bridge module, a full-bridge module and an H-bridge module shown in FIG. 1 to FIG. 3.

Figure 4:
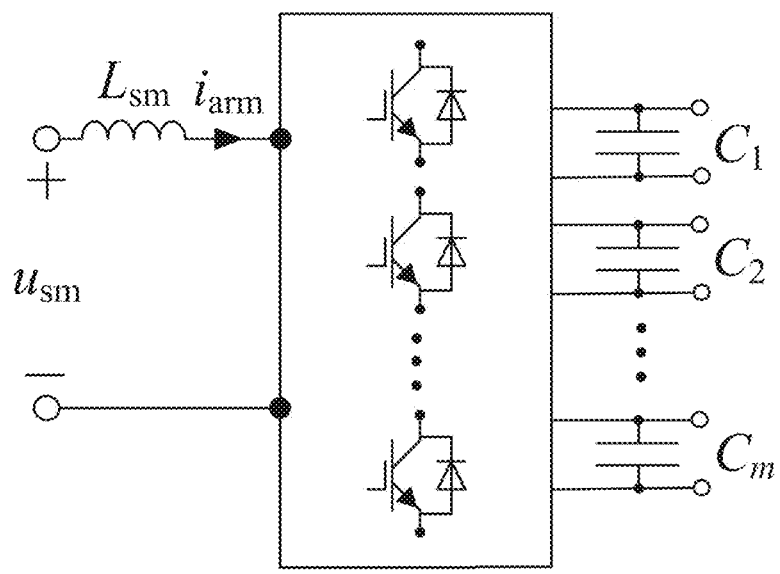
FIG. 4 is a topology diagram of modules in any VSC.

For the topological structure of any VSC module, as shown in FIG. 4, $i_{arm}$ is a port current, that is, an injection current of the converter, and $u_{sm}$ is a port voltage of the converter. Without loss of generality, it is assumed that each converter includes m capacitors $C_1, C_2, \ldots, C_m$. For ease of analysis, port inductance is equally divided into each port of the converter, that is, $L_{sm}=L/N$, wherein N is the number of sub-modules in the converter, and the sub-modules may be the half-bridge sub-module, the full-bridge sub-module, the H-bridge module, and so on.

Figure 5:
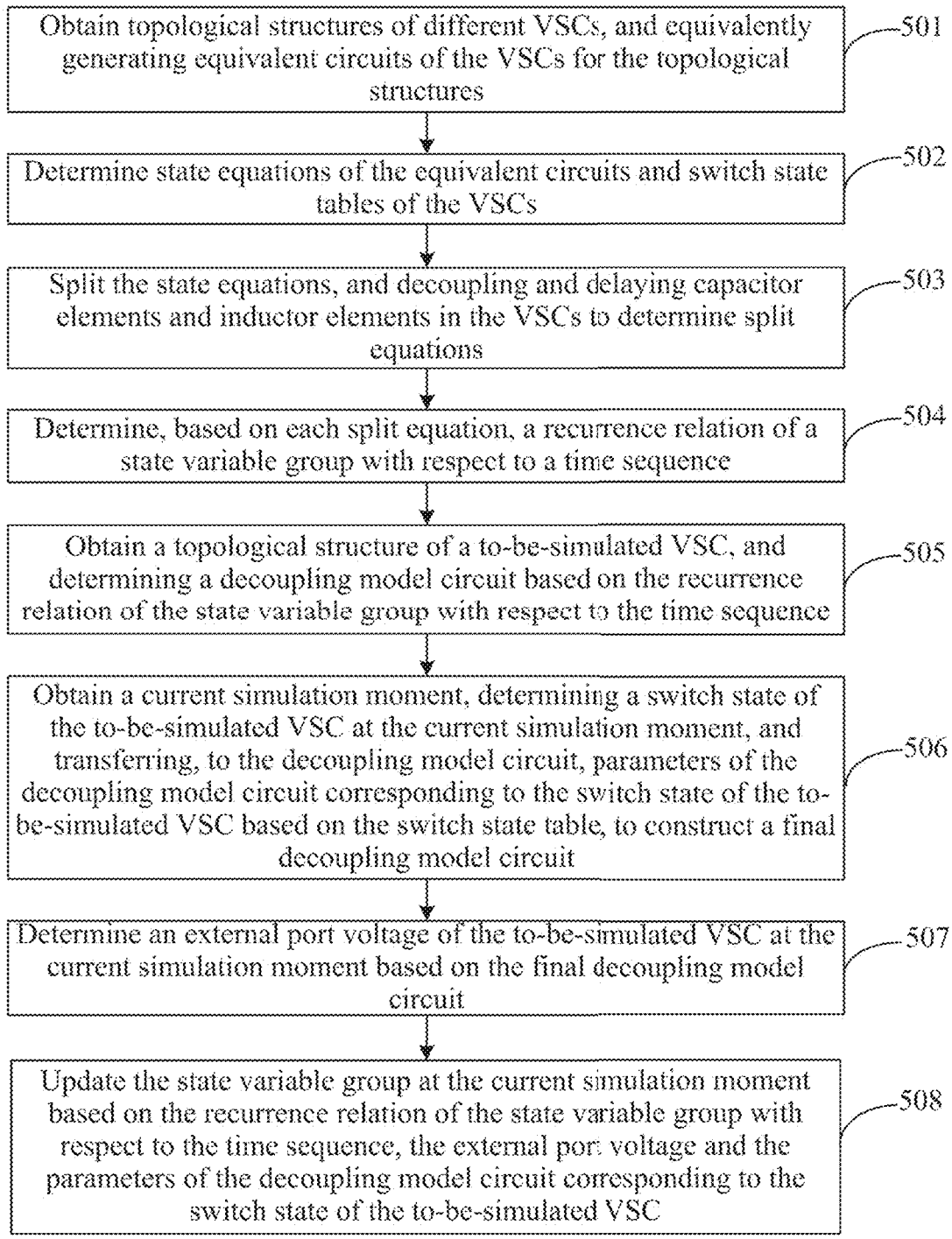
FIG. 5 is a flowchart of a general decoupling method for electromagnetic transient simulation of a VSC provided by the present disclosure.

For the above-mentioned topological structures of the VSC modules, a general decoupling method for electromagnetic transient simulation of the VSC is provided by the present disclosure. As shown in FIG. 5, a general decoupling method for electromagnetic transient simulation of the VSC includes following steps:

Step 501: Topological structures of different VSCs are obtained, and equivalent circuits of the VSCs are equivalently generated for the topological structures.

An equivalent transformation is performed on the circuit structure of the VSC shown in FIG. 4, to obtain an equivalent circuit. To be specific, a binary resistor model (the resistance value is $R_{on}=0.01\Omega$ when it is turned on, and the resistance value is $R_{off}=1$ MΩ when it is turned off) is adopted for each IGBT//VD switch group (that is, one IGBT and one VD are connected in anti-parallel) in FIG. 4, to obtain the equivalent circuit in FIG. 6.

Step 502: State equations of the equivalent circuits and switch state tables of the VSCs are determined, where the switch state tables includes switch states of the different VSCs and parameters of decoupling model circuits corresponding to the switch states, and the parameters of the decoupling model circuits include a variable resistor, a controlled voltage source, and a controlled current source.

The equivalent circuit lists the state equation of the equivalent circuit of a single-port converter, to obtain a relationship of a state variable group $u_C$ and $i_{arm}$, and obtain relevant parameters of the switch state table; where the relevant parameters of the switch state table include the variable resistor $R_{eq}$, the controlled voltage source $U_{eq}$, and the controlled current source $J_{eq}$.

Figure 6:
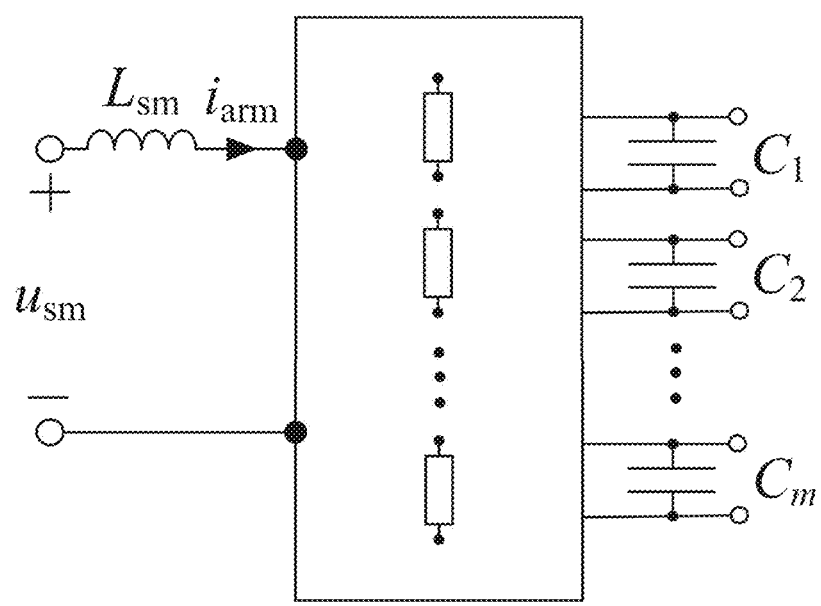
FIG. 6 is an equivalent circuit diagram of FIG. 4.

The state equation of the equivalent circuit shown in FIG. 6 is:

$$\begin{bmatrix} C & \\ & L \end{bmatrix} \begin{bmatrix} \frac{du_C}{dt} \\ \frac{di_{arm}}{dt} \end{bmatrix} = \begin{bmatrix} -G_{eq} & K_i \\ -K_u & -R_{eq} \end{bmatrix} \begin{bmatrix} u_C \\ i_{arm} \end{bmatrix} + \begin{bmatrix} i_d \\ u_{sm} \end{bmatrix}$$

Wherein, $G_{eq}$, $R_{eq}$, $K_u$, and $K_i$ are related parameters of a system matrix of formula (4-1); $C=\text{diag}[C_1, C_2, \ldots, C_{m1}]$ is an m1×m1 diagonal matrix, and $C_1, C_2, \ldots, C_{m1}$ represent m1 capacitors in the converter; $L=\text{diag}[L_1, L_2, \ldots, L_{m2}]$ is an m2×m2 diagonal matrix, and $L_1, L_2, \ldots, L_{m2}$ represent m2 inductors in the converter; $u_C=[u_{C1}, u_{C2}, \ldots, u_{Cm1}]^T$ is an m×1 column vector, and $u_{C1}, u_{C2}, \ldots, u_{Cm1}$ are capacitor voltages of m1 capacitor elements; $i_{arm}$ is a port current of the VSC; $G_{eq}$ is an admittance in parallel with the capacitor; $R_{eq}$ is a variable resistor in series with the inductor; $K_u$ is a coefficient matrix related to the capacitor voltage; $K_i$ is a coefficient matrix related to the inductor current; $i_d$ is an injection current of the capacitor element inside the VSC; and $u_{sm}$ is a port voltage of the VSC.

Step 503: The state equations are split, and the capacitor elements and inductor elements in the VSCs are decoupled and delayed to determine split equations.

It is assumed that the resistance of each IGBT switch group in the off state is infinite, that is, $R_{off} \to \infty$, then, $G_{eq} \approx 0$. The above state equation is decoupled:

$$\begin{bmatrix} C & \\ & L \end{bmatrix} \begin{bmatrix} \frac{du_C}{dt} \\ \frac{di_{arm}}{dt} \end{bmatrix} = \begin{bmatrix} 0 & \\ & -R_{eq} \end{bmatrix} \begin{bmatrix} u_C \\ i_{arm} \end{bmatrix} + \begin{bmatrix} & K_i \\ -K_u & \end{bmatrix} \begin{bmatrix} u_C \\ i_{arm} \end{bmatrix} + \begin{bmatrix} i_d \\ u_{sm} \end{bmatrix}.$$

Step 504: Based on each split equation, a recurrence relation of a state variable group with respect to a time sequence is determined, where the state variable group includes a port current and a voltage of each of the capacitor elements.

The split equation is differentiated by an implicit trapezoidal method, and some trapezoidal integral forms are replaced with central integral forms, to obtain the recurrence relation of $u_C$ and $i_{arm}$ with respect to the time sequence.

The differentiation by the implicit trapezoidal method difference method may adopt following methods:
(1) Half-Step Delay:
Difference Equation:

$$\begin{bmatrix} C & \\ & L \end{bmatrix}\begin{bmatrix} u_C^{n+1} - u_C^n \\ i_{arm}^{n+1/2} - i_{arm}^{n-1/2} \end{bmatrix} = \begin{bmatrix} 0 & \\ & -R_{eq} \end{bmatrix}\begin{bmatrix} C(u_C^{n+1} + u_C^n) \\ L(i_{arm}^{n+1/2} + i_{arm}^{n-1/2}) \end{bmatrix}\frac{\Delta t}{2} +$$

$$\begin{bmatrix} & K_i \\ -K_u & \end{bmatrix}\begin{bmatrix} u_C^n \\ i_{arm}^{n+1/2} \end{bmatrix}\Delta t + \begin{bmatrix} i_d \\ u_{sm} \end{bmatrix}\Delta t$$

Wherein, $\Delta t$ is a time step, n is any moment, $u_C^{n+1}$ is an m×1 column vector at the $(n+1)^{th}$ moment, $u_C^n$ the m×1 column vector at the $n^{th}$ moment, $i_{arm}^{n+1/2}$ is a port current of the VSC at the $(n+\frac{1}{2})^{th}$ moment, and $i_{arm}^{n-1/2}$ is a port current of the VSC at the $(n-\frac{1}{2})^{th}$ moment.
(2) One-Step Delay:
Difference Equation:

$$\begin{bmatrix} C & \\ & L \end{bmatrix}\begin{bmatrix} u_C^{n+1} - u_C^n \\ i_{arm}^{n+1} - i_{arm}^n \end{bmatrix} =$$

$$\begin{bmatrix} 0 & \\ & -R_{eq} \end{bmatrix}\begin{bmatrix} Cu_C^n \\ Li_{arm}^n \end{bmatrix}\Delta t + \begin{bmatrix} & K_i \\ -K_u & \end{bmatrix}\begin{bmatrix} u_C^n \\ i_{arm}^n \end{bmatrix}\Delta t + \begin{bmatrix} i_d \\ u_{sm} \end{bmatrix}\Delta t$$

Wherein, $i_{arm}^n$ is a port current of the VSC at the $n^{th}$ moment, and $i_{arm}^{n+1}$ is a port current of the VSC at the $(n+1)^{th}$ moment.

Step 505: A topological structure of a to-be-simulated VSC is obtained, and a decoupling model circuit is determined based on the recurrence relation of the state variable group with respect to the time sequence.

Step 506: A current simulation moment is obtained, a switch state of the to-be-simulated VSC at the current simulation moment is determined, and the parameters of the decoupling model circuit corresponding to the switch state of the to-be-simulated VSC are transferred to the decoupling model circuit based on the switch state table, to construct a final decoupling model circuit.

A construction process of the final decoupling model circuit specifically includes: assigning, based on the switch state table, the parameters of the decoupling model circuit corresponding to the switch state of the to-be-simulated VSC to the variable resistor, the controlled voltage source and the controlled current source in the decoupling model circuit, to construct the final decoupling model circuit.

Step 507: An external port voltage of the to-be-simulated VSC at the current simulation moment is determined based on the final decoupling model circuit.

The final decoupling circuit and an external network of the to-be-simulated VSC are combined into a main network, and the main network is solved in an electromagnetic transient simulation software, to obtain an external port voltage $u_{sm}$ of the converter at the current simulation moment (the $n^{th}$ moment).

Step 508: The state variable group at the current simulation moment is updated based on the recurrence relation of the state variable group with respect to the time sequence, the external port voltage and the parameters of the decoupling model circuit corresponding to the switch state of the to-be-simulated VSC.

After step 508, the method further includes: when the simulation duration t<the total simulation duration T, n=n+1, and return to step 506; otherwise, terminate the simulation.

Figure 7:
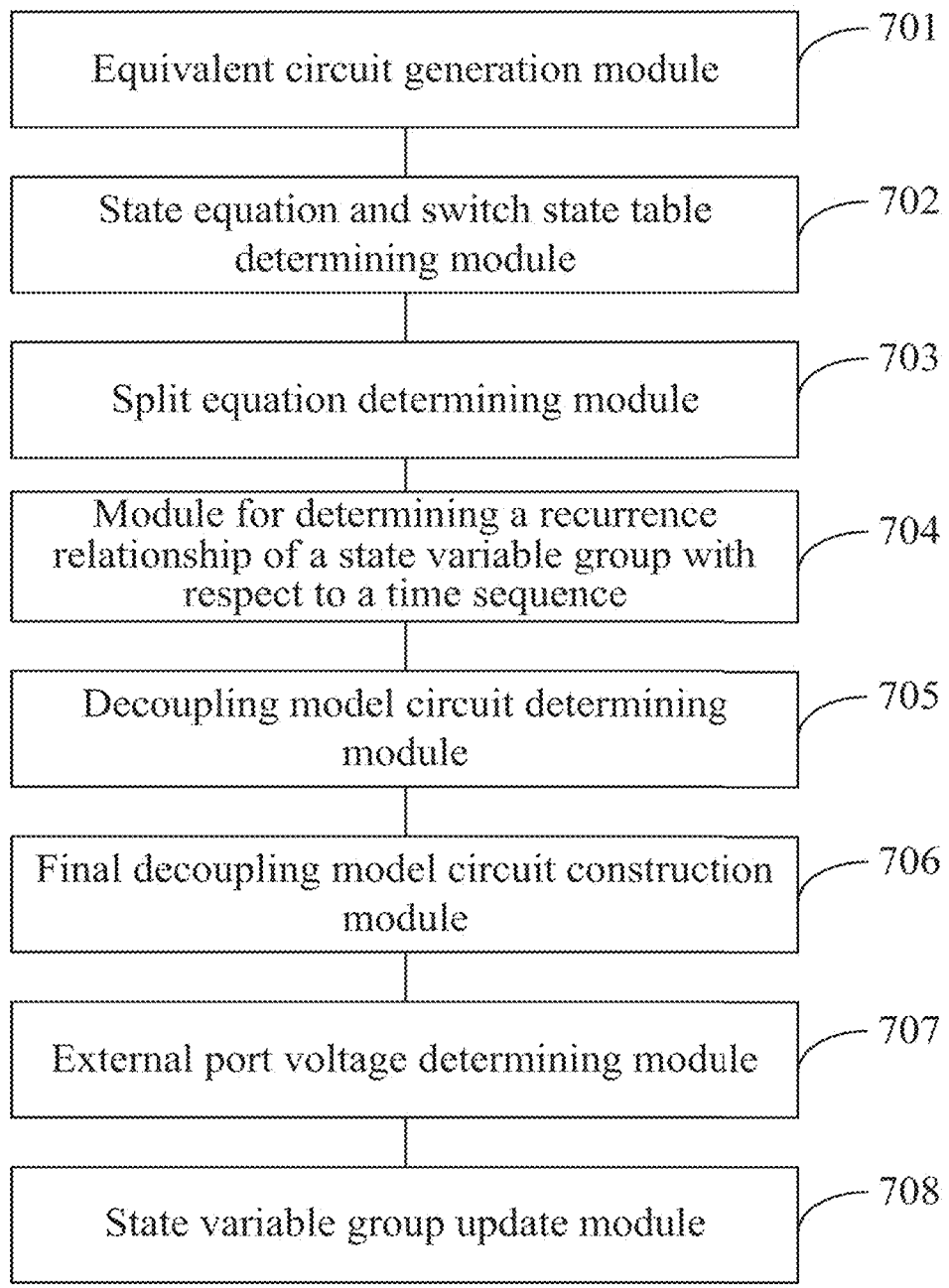
FIG. 7 is a structural diagram of a general decoupling system for electromagnetic transient simulation of the VSC provided by the present disclosure.

FIG. 7 is a structural diagram of a general decoupling system for electromagnetic transient simulation of the VSC provided by the present disclosure. As shown in FIG. 7, a general decoupling system for electromagnetic transient simulation of the VSC includes an equivalent circuit generation module 701, a state equation and switch state table determining module 702, a split equation determining module 703, a module 704 for determining a recurrence relation of a state variable group with respect to a time sequence, a decoupling model circuit determining module 705, a final decoupling model circuit construction module 706, an external port voltage determining module 707, and a state variable group update module 708.

The equivalent circuit generation module 701 is configured to obtain topological structures of different VSCs, and equivalently generate equivalent circuits of the VSCs for the topological structures.

The state equation and switch state table determining module 702 is configured to determine state equations of the equivalent circuits and switch state tables of the VSCs, where the switch state tables include switch states of the different VSCs and parameters of decoupling model circuits corresponding to the switch states, and the parameters of the decoupling model circuits include a variable resistor, a controlled voltage source, and a controlled current source.

The state equation of the equivalent circuit is:

$$\begin{bmatrix} C & \\ & L \end{bmatrix}\begin{bmatrix} \frac{du_C}{dt} \\ \frac{di_{arm}}{dt} \end{bmatrix} = \begin{bmatrix} -G_{eq} & K_i \\ -K_u & -R_{eq} \end{bmatrix}\begin{bmatrix} u_C \\ i_{arm} \end{bmatrix} + \begin{bmatrix} i_d \\ u_{sm} \end{bmatrix},$$

where $C = \text{diag}[C_1, C_2, \ldots C_{m1}]$ is an m1 xm1 diagonal matrix, and $C_1, C_2, \ldots, C_{m1}$ represent m1 capacitors in the converter; $L = \text{diag}[L_1, L_2, \ldots, L_{m2}]$ is an m2×m2 diagonal matrix, and $L_1, L_2, \ldots, L_{m2}$ represent m2 inductors in the converter; $u_C = [u_{C1}, u_{C2}, \ldots, u_{Cm1}]^T$ is an m×1 column vector, and $u_{C1}, u_{C2}, \ldots, u_{Cm1}$ are capacitor voltages of m1 capacitor elements; $i_{arm}$ is a port current of the VSC; $G_{eq}$ is an admittance in parallel with the capacitor; $R_{eq}$ is a variable resistor in series with the inductor; $K_u$ is a coefficient matrix related to the capacitor voltage; $K_i$ is a coefficient matrix related to the inductor current; $i_d$ is an injection current of the capacitor element inside the VSC; and $u_{sm}$ is a port voltage of the VSC.

The split equation determining module 703 is configured to split the state equations, and decouple and delay the capacitor elements and inductor elements in the VSCs to determine split equations.

The split equation is:

$$\begin{bmatrix} C & \\ & L \end{bmatrix}\begin{bmatrix} \frac{du_C}{dt} \\ \frac{di_{arm}}{dt} \end{bmatrix} = \begin{bmatrix} 0 & \\ & -R_{eq} \end{bmatrix}\begin{bmatrix} u_C \\ i_{arm} \end{bmatrix} + \begin{bmatrix} & K_i \\ -K_u & \end{bmatrix}\begin{bmatrix} u_C \\ i_{arm} \end{bmatrix} + \begin{bmatrix} i_d \\ u_{sm} \end{bmatrix}.$$

The module 704 for determining the recurrence relation of the state variable group with respect to the time sequence is configured to determine, based on each split equation, the recurrence relation of the state variable group with respect to the time sequence, where the state variable group includes a port current and a voltage of each of the capacitor elements.

The module 704 for determining the recurrence relation of the state variable group with respect to the time sequence specifically includes: a unit for determining the recurrence relation of the state variable group with respect to the time sequence, configured to differentiate the split equation by an implicit trapezoidal method, and replace a trapezoidal integral form in a specified area with a central integral form, to determine the recurrence relation of the state variable group with respect to the time sequence.

The decoupling model circuit determining module 705 is configured to obtain a topological structure of a to-be-simulated VSC, and determine a decoupling model circuit based on the recurrence relation of the state variable group with respect to the time sequence.

The final decoupling model circuit construction module 706 is configured to: obtain a current simulation moment, determine a switch state of the to-be-simulated VSC at the current simulation moment, and transfer, to the decoupling model circuit, the parameters of the decoupling model circuit corresponding to the switch state of the to-be-simulated VSC based on the switch state table, to construct a final decoupling model circuit.

The external port voltage determining module 707 is configured to determine an external port voltage of the to-be-simulated VSC at the current simulation moment based on the final decoupling model circuit.

The state variable group update module 708 is configured to update the state variable group at the current simulation moment based on the recurrence relation of the state variable group with respect to the time sequence, the external port voltage and the parameters of the decoupling model circuit corresponding to the switch state of the to-be-simulated VSC.

The present disclosure further includes: a first determining module, configured to determine whether current simulation duration is less than total simulation duration, and obtain a first determining result; a step return module, configured to: when the first determining result indicates that the current simulation duration is less than the total simulation duration, use a next simulation moment as the current simulation moment, and return to the step of "determining the switch state of the to-be-simulated VSC at the current simulation moment, and transfer, to the decoupling model circuit, the parameters of the decoupling model circuit corresponding to the switch state of the to-be-simulated VSC based on the switch state table, to construct a final decoupling model circuit"; and a simulation termination module, configured to terminate the simulation process when the first determining result indicates that the current simulation duration is not less than the total simulation duration.

The following lists switch state tables corresponding to topology diagrams of modules in several common VSCs.

Figure 8:
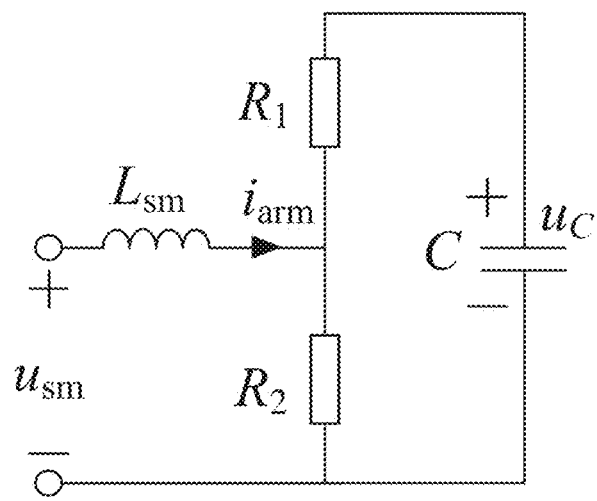
FIG. 8 is a schematic diagram of an equivalent circuit of FIG. 1.

FIG. 8 is a schematic diagram of an equivalent circuit of FIG. 1. Table 1 is a switch state table corresponding to a half-bridge sub-module.

TABLE 1

| | $T_1$ | $T_2$ | $i_{arm}$ | $R_{eq}$ | $U_{eq}$ | $J_{eq}$ |
|---|---|---|---|---|---|---|
| Normal | 1 | 0 | — | $R_{on}$ | $u_C$ | $i_{arm}$ |
| | 0 | 1 | — | $R_{on}$ | 0 | 0 |
| Blocked | 1 | 0 | >0 | $R_{on}$ | $u_C$ | $i_{arm}$ |
| | 0 | 1 | <0 | $R_{on}$ | 0 | 0 |

Figure 9:
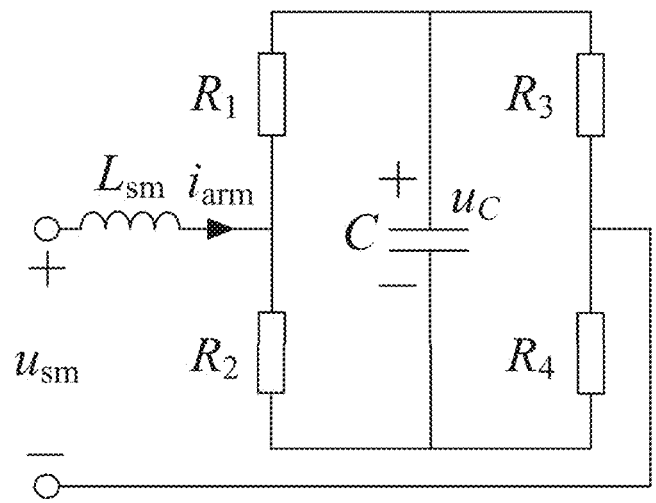
FIG. 9 is a schematic diagram of an equivalent circuit of FIG. 2.

FIG. 9 is a schematic diagram of an equivalent circuit of FIG. 2. Table 2 is a switch state table corresponding to a full-bridge sub-module.

TABLE 2

| | $T_1$ | $T_2$ | $T_3$ | $T_4$ | $i_{arm}$ | $R_{eq}$ | $U_{eq}$ | $J_{eq}$ |
|---|---|---|---|---|---|---|---|---|
| Normal | 1 | 0 | 0 | 1 | — | $2R_{on}$ | $u_C$ | $i_{arm}$ |
| | 0 | 1 | 1 | 0 | — | $2R_{on}$ | $-u_C$ | $-i_{arm}$ |
| | 1 | 0 | 1 | 0 | — | $2R_{on}$ | 0 | 0 |
| | 0 | 1 | 0 | 1 | — | $2R_{on}$ | 0 | 0 |
| Blocked | 1 | 0 | 0 | 1 | >0 | $2R_{on}$ | $u_C$ | $i_{arm}$ |
| | 0 | 1 | 1 | 0 | <0 | $2R_{on}$ | $u_C$ | $i_{arm}$ |

Figure 10:
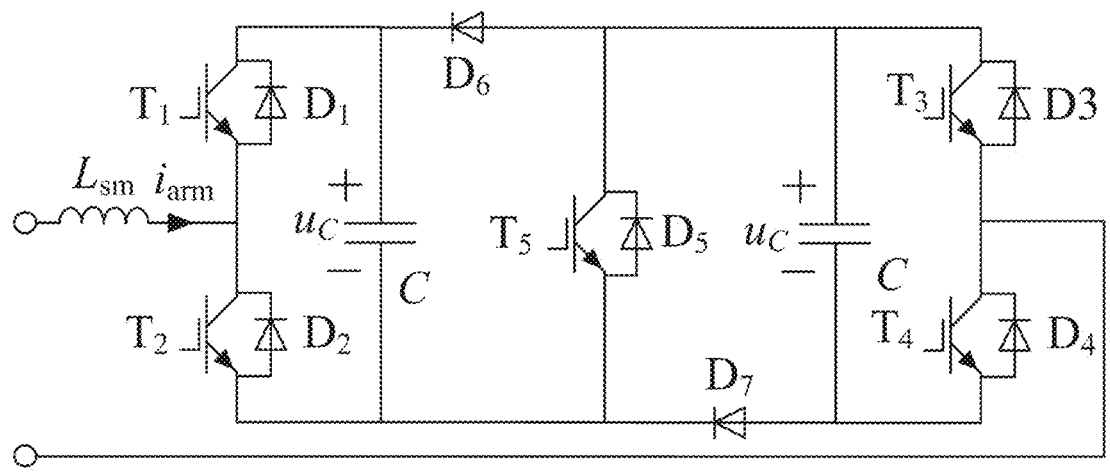
FIG. 10 is a topology diagram of a clamp double sub-module.
Figure 11:
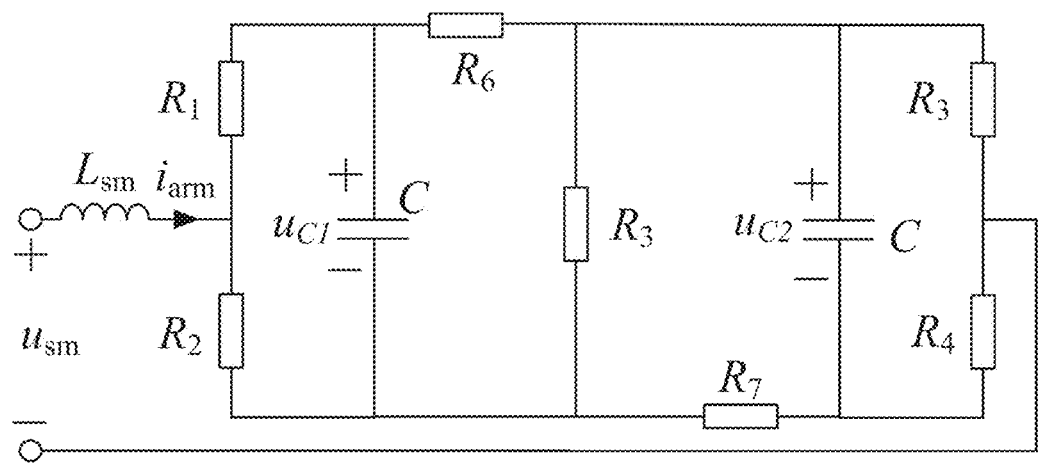
FIG. 11 is a schematic diagram of an equivalent circuit of the clamp double sub-module.

FIG. 10 is a topology diagram of a clamp double sub-module, and FIG. 11 is a schematic diagram of an equivalent circuit of the clamp double sub-module. Table 3 is a switch state table corresponding to the clamp double sub-module.

TABLE 3

| | $T_1$ | $T_2$ | $T_3$ | $T_4$ | $T_5$ | $D_6$ | $D_7$ | $i_{arm}$ | $R_{eq}$ | $U_{eq}$ | $J_{eq1}$ | $J_{eq2}$ |
|---|---|---|---|---|---|---|---|---|---|---|---|---|
| Normal | 1 | 0 | 0 | 1 | 1 | 0 | 0 | — | $3R_{on}$ | $2u_C$ | $i_{arm}$ | $i_{arm}$ |
| | 0 | 1 | 1 | 0 | 1 | 0 | 0 | — | $3R_{on}$ | 0 | 0 | 0 |
| | 1 | 0 | 1 | 0 | 1 | 0 | 0 | — | $3R_{on}$ | $u_C$ | $i_{arm}$ | 0 |
| | 0 | 1 | 0 | 1 | 1 | 0 | 0 | — | $3R_{on}$ | $u_C$ | 0 | $i_{arm}$ |
| Blocked | 1 | 0 | 0 | 1 | 0 | 1 | 1 | >0 | $3R_{on}$ | $2u_C$ | $i_{arm}$ | $i_{arm}$ |
| | 0 | 1 | 0 | 1 | 0 | 1 | 1 | <0 | $2.5R_{on}$ | $u_C$ | $-i_{arm}/2$ | $-i_{arm}/2$ |

Figure 12:
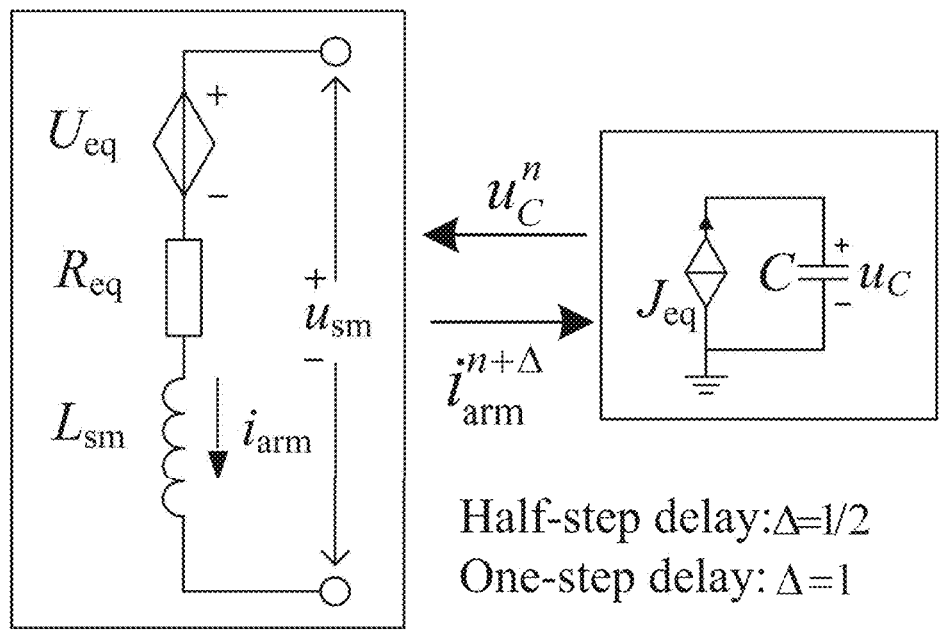
FIG. 12 is a schematic diagram of a general decoupling model circuit of the half-bridge sub-module, the full-bridge sub-module and the clamp double sub-module.

FIG. 12 is a schematic diagram of a general decoupling model circuit of the half-bridge sub-module, the full-bridge sub-module, and the clamp double sub-module.

Figure 13:
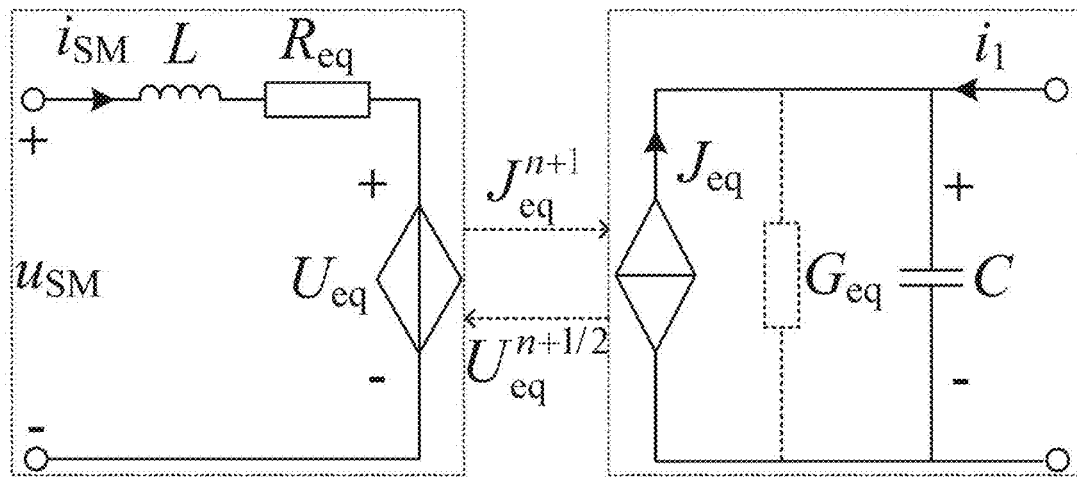
FIG. 13 is a schematic diagram of a decoupling model circuit of FIG. 3.

FIG. 13 is a schematic diagram of the decoupling model circuit of FIG. 3. Table 4 is a switch state table corresponding to an H-bridge module.

TABLE 4

| | T1 | $T_2$ | $T_3$ | $T_4$ | $i_{SM}$ | $R_{eq}$ | $U_{eq}$ | $J_{eq}$ |
|---|---|---|---|---|---|---|---|---|
| Normal | 1 | 0 | 0 | 1 | — | $2R_{on}$ | $-u_C$ | $i_{SM}$ |
| | 0 | 1 | 1 | 0 | — | $2R_{on}$ | $u_C$ | $-i_{SM}$ |
| Blocked | 1 | 0 | 0 | 1 | >0 | $2R_{on}$ | $u_C$ | $i_{SM}$ |
| | 0 | 1 | 0 | 1 | <0 | $2R_{on}$ | $-u_C$ | $-i_{SM}$ |

Figure 14:
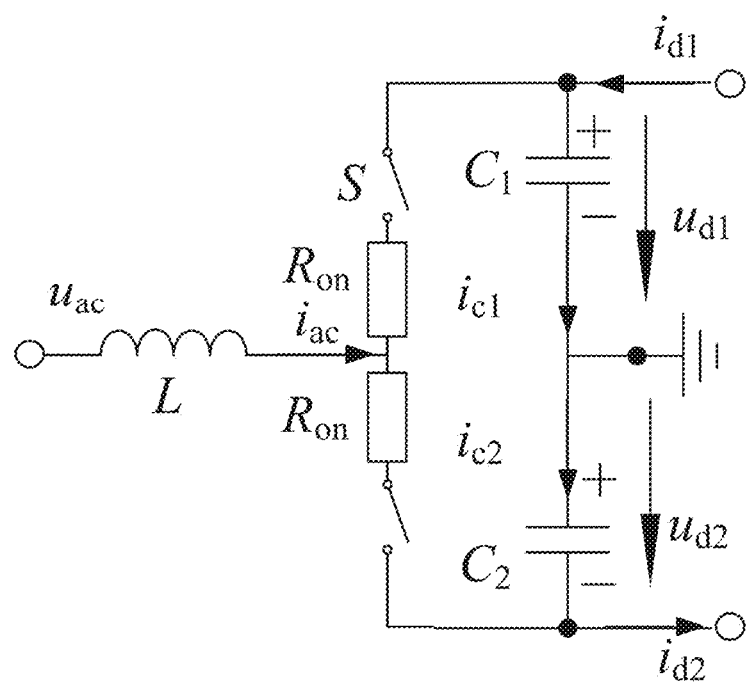
FIG. 14 is an equivalent circuit diagram of a single bridge arm switch function of a capacitor-grounded VSC.
Figure 15:
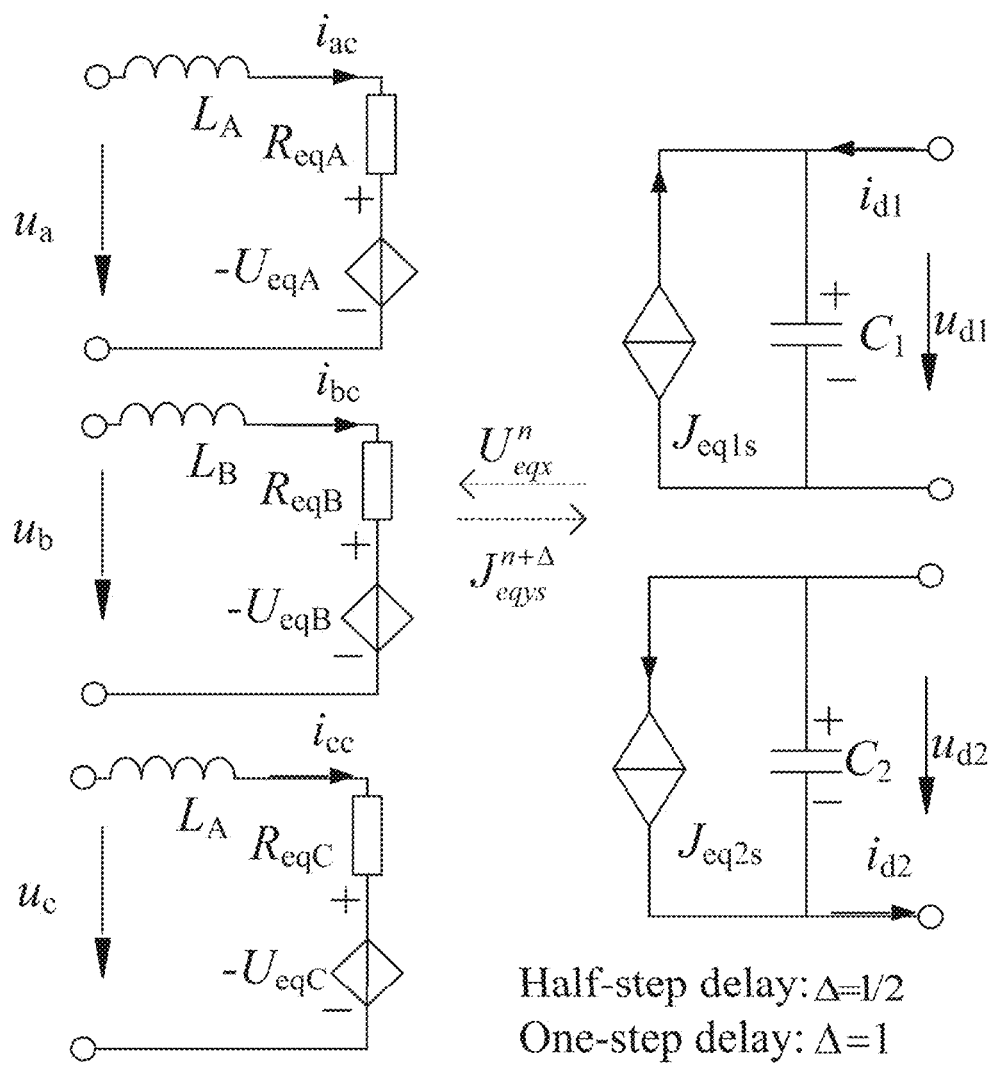
FIG. 15 is a decoupling equivalent circuit diagram of the capacitor-grounded VSC.

FIG. 14 is an equivalent circuit diagram of a single bridge arm switch function of a capacitor-grounded VSC, and FIG. 15 is a decoupling equivalent circuit diagram of the capacitor-grounded VSC. Table 5 is a switch state table corresponding to a switch combination of the capacitor-grounded VSC.

TABLE 5

| $T_1$ | $T_2$ | $T_3$ | $T_4$ | $T_5$ | $T_6$ | $R_{eqx}$ | $U_{eqA}$ | $U_{eqB}$ | $U_{eqC}$ | $J_{eq1s}$ | $J_{eq2s}$ |
|---|---|---|---|---|---|---|---|---|---|---|---|
| 1 | 0 | 0 | 0 | 1 | 1 | $R_{on}$ | $-u_{d1}$ | $u_{d2}$ | $-u_{d1}$ | $i_{ac} + i_{cc}$ | $i_{bc}$ |
| 0 | 0 | 0 | 1 | 1 | 1 | $R_{on}$ | $u_{d2}$ | $u_{d2}$ | $-u_{d1}$ | $i_{cc}$ | $i_{ac} + i_{bc}$ |
| 0 | 1 | 0 | 1 | 0 | 1 | $R_{on}$ | $u_{d2}$ | $u_{d2}$ | $u_{d2}$ | 0 | $i_A + i_B + i_C$ |
| 1 | 0 | 1 | 0 | 1 | 0 | $R_{on}$ | $-u_{d1}$ | $-u_{d1}$ | $-u_{d1}$ | $i_{ac} + i_{bc} + i_{cc}$ | 0 |
| 1 | 1 | 0 | 0 | 0 | 1 | $R_{on}$ | $-u_{d1}$ | $u_{d2}$ | $u_{d2}$ | $i_{ac}$ | $i_{bc} + i_{cc}$ |
| 1 | 1 | 1 | 0 | 0 | 0 | $R_{on}$ | $-u_{d1}$ | $-u_{d1}$ | $u_{d2}$ | $i_{ac} + i_{bc}$ | $i_{cc}$ |
| 0 | 1 | 1 | 1 | 0 | 0 | $R_{on}$ | $u_{d2}$ | $-u_{d1}$ | $u_{d2}$ | $i_{bc}$ | $i_{ac} + i_{cc}$ |
| 0 | 0 | 1 | 1 | 1 | 0 | $R_{on}$ | $u_{d2}$ | $-u_{d1}$ | $-u_{d1}$ | $i_{bc} + i_{cc}$ | $i_{ac}$ |

Figure 16:
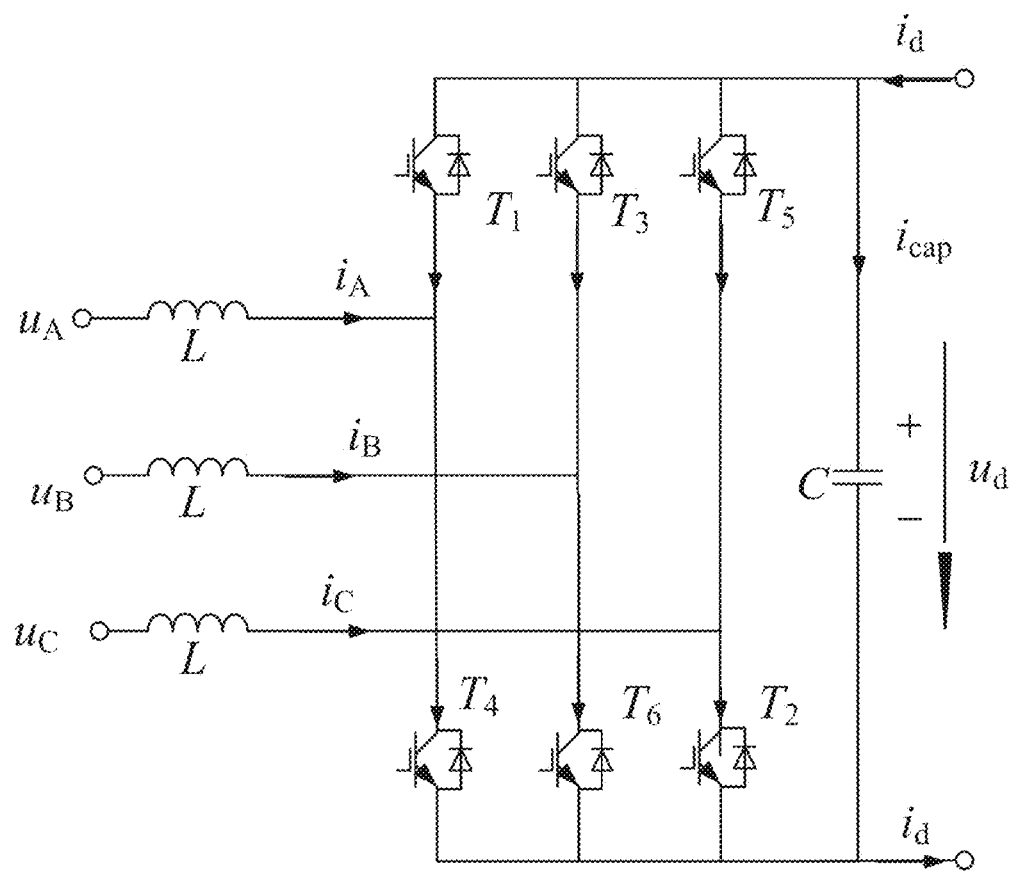
FIG. 16 is a topology diagram of a capacitor-ungrounded VSC.
Figure 17:
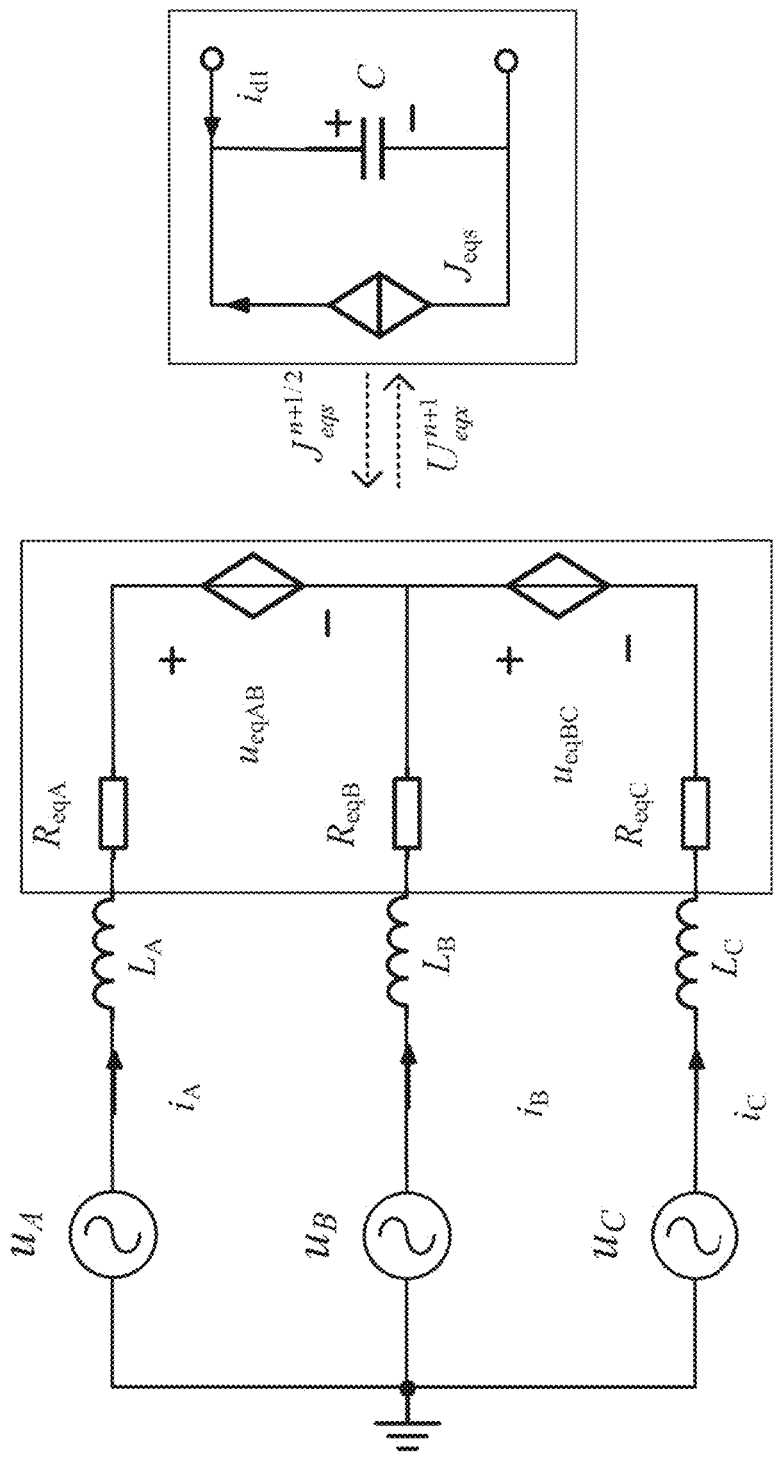
FIG. 17 is a decoupling circuit diagram of the capacitor-ungrounded VSC based on a half-step delay.

FIG. 16 is a topology diagram of a capacitor-ungrounded VSC, and FIG. 17 is a decoupling circuit diagram of the capacitor-ungrounded VSC based on a half-step delay. Table 6 is a switch state table corresponding to a switch combination of the capacitor-ungrounded VSC.

TABLE 6

| $T_1$ | $T_2$ | $T_3$ | $T_4$ | $T_5$ | $T_6$ | $R_{eqx}$ | $U_{eqAB}$ | $U_{eqBC}$ | $J_{eqs}$ |
|---|---|---|---|---|---|---|---|---|---|
| 1 | 0 | 0 | 0 | 1 | 1 | $R_{on}$ | $u_d$ | $-u_d$ | $i_A + i_C$ |
| 0 | 0 | 0 | 1 | 1 | 1 | $R_{on}$ | 0 | $-u_d$ | $i_C$ |
| 0 | 1 | 0 | 1 | 0 | 1 | $R_{on}$ | 0 | 0 | 0 |
| 1 | 0 | 1 | 0 | 1 | 0 | $R_{on}$ | 0 | 0 | $i_A + i_B + i_C$ |
| 1 | 1 | 0 | 0 | 0 | 1 | $R_{on}$ | $u_d$ | 0 | $i_A$ |
| 1 | 1 | 1 | 0 | 0 | 0 | $R_{on}$ | 0 | $u_d$ | $i_A + i_B$ |
| 0 | 1 | 1 | 1 | 0 | 0 | $R_{on}$ | $-u_d$ | $u_d$ | $i_B$ |
| 0 | 0 | 1 | 1 | 1 | 0 | $R_{on}$ | $-u_d$ | 0 | $i_B + i_C$ |

The difference equation used in the present disclosure adopts an implicit trapezoidal integral form for both state variables and non-state variables, and utilizes the approximate equivalence of the trapezoidal integral area and the central integral area. Therefore, the accuracy of the implicit trapezoidal integral form is the same as the trapezoidal integral, and the simulation accuracy thereof is higher than a parallel algorithm based on the forward Euler method or the backward Euler method. Compared with a switch function model, the electromagnetic transient simulation decoupling model provided by the present disclosure may account for the conduction loss of the switch device.

The high calculation efficiency of the present disclosure is shown in following aspects:
(1) The system admittance is constant. The port equivalent resistance $R_{eq}$ is a fixed value, and the converter equivalent conductance $G_{eq} \approx 0$, so that there is no need to rebuild the admittance matrix of the converter and port when the switch state changes.
(2) During the simulation process, the change of the converter's working state is manifested as the change of coefficients $K_u$ and $K_i$ of $U_{eq}$ and $J_{eq}$.
(3) The approximate equivalent of the central integral and the implicit trapezoidal integral is used to decouple the half-step delay of the state variable group (the port current $i_{arm}$ and the capacitor voltage $u_C$), so that the port and the converter are calculated alternately and differ by half time step. If the converter includes multiple sub-modules, all sub-modules of the entire converter may be solved in parallel.
(4) Because the method provided by the present disclosure decouples and delays the state variables (the inductor current and the capacitor voltage) of the system, decoupled variables do not change suddenly due to switch actions, so there is no need to switch the integral form during the switch actions (for example, switching from the central integral to backward Euler).

In this way, consistency of the decoupling form may be maintained without losing its parallel characteristics.

The decoupling model and simulation framework established based on the present disclosure both has the precision similar to the detailed model and has higher calculation efficiency than the existing Thevenin equivalent model. The simplicity of model parameter calculation makes the model more versatile and extensible, which helps to improve the development efficiency of simulation programs.

Various embodiments of the present specification are described in a progressive manner, each embodiment focuses on the difference from other examples, and the same and similar parts between the various embodiments may be referred to with each other. For the system disclosed in the embodiments, since the system corresponds to the method disclosed in the embodiments, the description is relatively simple, and reference can be made to the method description.

In this specification, several specific embodiments are used for illustration of the principles and implementations of the present disclosure, and the descriptions of the foregoing embodiments are used to help understand the method and the core ideas of the present disclosure. Meanwhile, for those of ordinary skill in the art, there will be changes in the specific implementations and the scope of application in accordance with the ideas of the present disclosure. In conclusion, the content of this specification shall not be construed as a limitation to the present disclosure.

What is claimed is:
1. A general decoupling method for electromagnetic transient simulation of a voltage source converter (VSC), comprising:
obtaining and inputting a topological structure of a to-be-simulated VSC into a decoupling model circuit determination module to determine a decoupling model circuit of the to-be-simulated VSC based on a recurrence relation of a state variable group with respect to a time sequence, the state variable group comprising a port current and a voltage of each of capacitor elements, wherein the decoupling model circuit determination module is contained in an electromagnetic transient simulation device provided with one or more processors and an electromagnetic transient simulation software, and the recurrence relation of the state variable group with respect to the time sequence is determined as follows:
obtaining topological structures of different VSCs, and equivalently generating equivalent circuits of the VSCs for the topological structures;
determining state equations of the equivalent circuits and switch state tables of the VSCs, wherein the switch state tables comprise switch states of the different VSCs and decoupling model circuit parameters corresponding to the switch states, and the decoupling model circuit parameters comprise a variable resistor, a controlled voltage source, and a controlled current source;

splitting the state equations, and decoupling and delaying the capacitor elements and inductor elements in the VSCs to determine split equations; and determining, based on each split equation, the recurrence relation of the state variable group with respect to the time sequence;

establishing the decoupling model circuit of the to-be-simulated VSC determined in the electromagnetic transient simulation software, obtaining a current simulation moment, determining a switch state of the to-be-simulated VSC at the current simulation moment, and transferring, to the decoupling model circuit, decoupling model circuit parameters corresponding to the switch state of the to-be-simulated VSC based on the switch state table, to construct a final decoupling model circuit;

running the final decoupling model circuit, to determine an external port voltage of the to-be-simulated VSC at the current simulation moment;

updating the state variable group of the final decoupling model circuit at the current simulation moment based on the recurrence relation of the state variable group with respect to the time sequence, the external port voltage and the decoupling model circuit parameters corresponding to the switch state of the to-be-simulated VSC;

determining whether current simulation duration is less than total simulation duration, and obtaining a first determining result;

using a next simulation moment as the current simulation moment, and returning to the step of determining the switch state of the to-be-simulated VSC at the current simulation moment, and transferring, to the decoupling model circuit, the decoupling model circuit parameters corresponding to the switch state of the to-be-simulated VSC based on the switch state table, to construct a final decoupling model circuit in response to the first determining result indicating that the current simulation duration is less than the total simulation duration; and terminating a simulation process, in response to the first determining result indicating that the current simulation duration is not less than the total simulation duration, to output, from the electromagnetic transient simulation software, data on electrical quantities with respect to transient phenomenon of the to-be-simulated VSC;

wherein determining, based on each split equation, the recurrence relation of the state variable group with respect to the time sequence comprises:

differentiating the split equation by an implicit trapezoidal method, and replacing a trapezoidal integral form in a specified area with a central integral form, to determine the recurrence relation of the state variable group with respect to the time sequence.

2. The general decoupling method for electromagnetic transient simulation of the VSC according to claim 1, wherein the state equation of the equivalent circuit is:

$$\begin{bmatrix} C & \\ & L \end{bmatrix} \begin{bmatrix} \frac{du_C}{dt} \\ \frac{di_{arm}}{dt} \end{bmatrix} = \begin{bmatrix} -G_{eq} & K_i \\ -K_u & -R_{eq} \end{bmatrix} \begin{bmatrix} u_C \\ i_{arm} \end{bmatrix} + \begin{bmatrix} i_d \\ u_{sm} \end{bmatrix},$$

wherein C=diag [$C_1, C_2, \ldots, C_{m1}$] is an m1×m1 diagonal matrix, and $C_1, C_2, \ldots, C_{m1}$ represent m1 capacitors in the converter; L=diag [$L_1, L_2, \ldots, L_{m2}$] is an m2×m2 diagonal matrix, and $L_1, L_2, \ldots, L_{m2}$ represent m2 inductors in the converter; $u_C = [u_{C1}, u_{C2}, \ldots, u_{Cm1}]^T$ is an m×1 column vector, and $u_{C1}, u_{C2}, \ldots, U_{Cm1}$ are capacitor voltages of m1 capacitor elements; $i_{arm}$ is a port current of the VSC; $G_{eq}$ is an admittance in parallel with the capacitor; $R_{eq}$ is a variable resistor in series with the inductor; $K_u$ is a coefficient matrix related to the capacitor voltage; $K_i$ is a coefficient matrix related to the inductor current; $i_d$ is an injection current of the capacitor element inside the VSC; and $u_{sm}$ is a port voltage of the VSC.

3. The general decoupling method for electromagnetic transient simulation of the VSC according to claim 2, wherein the split equation is:

$$\begin{bmatrix} C & \\ & L \end{bmatrix} \begin{bmatrix} \frac{du_C}{dt} \\ \frac{di_{arm}}{dt} \end{bmatrix} = \begin{bmatrix} 0 & \\ & -R_{eq} \end{bmatrix} \begin{bmatrix} u_C \\ i_{arm} \end{bmatrix} + \begin{bmatrix} & K_i \\ -K_u & \end{bmatrix} \begin{bmatrix} u_C \\ i_{arm} \end{bmatrix} + \begin{bmatrix} i_d \\ u_{sm} \end{bmatrix}.$$

4. A general decoupling system for electromagnetic transient simulation of a voltage source converter (VSC), comprising:

one or more processors; and a memory having a decoupling model circuit determination module and an electromagnetic transient simulation software stored thereon, which, when executed by the one or more processors, cause the one or more processors to:

obtain a topological structure of a to-be-simulated VSC, and determine by the decoupling model circuit determination module a decoupling model circuit of the to-be-simulated VSC based on a recurrence relation of a state variable group with respect to a time sequence, the state variable group comprising a port current and a voltage of each of capacitor elements, wherein the recurrence relation of the state variable group with respect to the time sequence is determined as follows:

obtaining topological structures of different VSCs, and equivalently generating equivalent circuits of the VSCs for the topological structures;

determining state equations of the equivalent circuits and switch state tables of the VSCs, wherein the switch state tables comprise switch states of the different VSCs and decoupling model circuit parameters corresponding to the switch states, and the decoupling model circuit parameters comprise a variable resistor, a controlled voltage source, and a controlled current source;

splitting the state equations, and decoupling and delaying the capacitor elements and inductor elements in the VSCs to determine split equations; and determining, based on each split equation, the recurrence relation of the state variable group with respect to the time sequence;

establish the decoupling model circuit of the to-be-simulated VSC determined in the electromagnetic transient simulation software, obtain a current simulation moment, determine a switch state of the to-be-simulated VSC at the current simulation moment, and transfer, to the decoupling model circuit, decoupling model circuit parameters corresponding to the switch state of the to-be-simulated VSC based on the switch state table, to construct a final decoupling model circuit;

run the final decoupling model circuit, to determine an external port voltage of the to-be-simulated VSC at the current simulation moment;

update the state variable group of the final decoupling model circuit at the current simulation moment based on the recurrence relation of the state variable group with respect to the time sequence, the external port voltage and the decoupling model circuit parameters corresponding to the switch state of the to-be-simulated VSC;

determine whether current simulation duration is less than total simulation duration, and obtain a first determining result;

use a next simulation moment as the current simulation moment, and return to the step of determining the switch state of the to-be-simulated VSC at the current simulation moment, and transfer, to the decoupling model circuit, the decoupling model circuit parameters corresponding to the switch state of the to-be-simulated VSC based on the switch state table, to construct a final decoupling model circuit in response to the first determining result indicating that the current simulation duration is less than the total simulation duration; and terminate a simulation process, in response to the first determining result indicating that the current simulation duration is not less than the total simulation duration, to output, from the electromagnetic transient simulation software, data on electrical quantities with respect to transient phenomenon of the to-be-simulated VSC;

wherein determining, based on each split equation, the recurrence relation of the state variable group with respect to the time sequence comprises:

differentiating the split equation by an implicit trapezoidal method, and replacing a trapezoidal integral form in a specified area with a central integral form, to determine the recurrence relation of the state variable group with respect to the time sequence.

5. The general decoupling system for electromagnetic transient simulation of the VSC according to claim 4, wherein the state equation of the equivalent circuit is:

$$\begin{bmatrix} C & \\ & L \end{bmatrix} \begin{bmatrix} \frac{du_C}{dt} \\ \frac{di_{arm}}{dt} \end{bmatrix} = \begin{bmatrix} -G_{eq} & K_i \\ -K_u & -R_{eq} \end{bmatrix} \begin{bmatrix} u_C \\ i_{arm} \end{bmatrix} + \begin{bmatrix} i_d \\ u_{sm} \end{bmatrix},$$

wherein C=diag [$C_1$, $C_2$, ..., $C_{m1}$] is an m1×m1 diagonal matrix, and $C_1$, $C_2$, ..., $C_{m1}$ represent m1 capacitors in the converter; L=diag [$L_1$, $L_2$, ..., $L_{m2}$] is an m2×m2 diagonal matrix, and $L_1$, $L_2$, ..., $L_{m2}$ represent m2 inductors in the converter; $u_C$=[$u_{C1}$, $u_{C2}$, ..., $u_{Cm1}$]$^T$ is an m×1 column vector, and $u_{C1}$, $u_{C2}$, ..., $u_{Cm1}$ are capacitor voltages of m1 capacitor elements; $i_{arm}$ is a port current of the VSC; $G_{eq}$ is an admittance in parallel with the capacitor; $R_{eq}$ is a variable resistor in series with the inductor; $K_u$ is a coefficient matrix related to the capacitor voltage; $K_i$ is a coefficient matrix related to the inductor current; $i_d$ is an injection current of the capacitor element inside the VSC; and $u_{sm}$ is a port voltage of the VSC.

6. The general decoupling system for electromagnetic transient simulation of the VSC according to claim 5, wherein the split equation is:

$$\begin{bmatrix} C & \\ & L \end{bmatrix} \begin{bmatrix} \frac{du_C}{dt} \\ \frac{di_{arm}}{dt} \end{bmatrix} = \begin{bmatrix} 0 & \\ & -R_{eq} \end{bmatrix} \begin{bmatrix} u_C \\ i_{arm} \end{bmatrix} + \begin{bmatrix} & K_i \\ -K_u & \end{bmatrix} \begin{bmatrix} u_C \\ i_{arm} \end{bmatrix} + \begin{bmatrix} i_d \\ u_{sm} \end{bmatrix}.$$

* * * * *